United States Patent
Tsuji et al.

(10) Patent No.: US 7,844,978 B2
(45) Date of Patent: Nov. 30, 2010

(54) ARTIFACT MANAGEMENT FOR AN EXTENSIBLE RUNTIME ENVIRONMENT

(75) Inventors: Hiroshi Tsuji, Stouffville (CA); Sebastian Carbajales, Toronto (CA); Vladimir Klicnik, Oshawa (CA); Lok T. Loi, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1216 days.

(21) Appl. No.: 11/421,814

(22) Filed: Jun. 2, 2006

(65) Prior Publication Data

US 2007/0283368 A1     Dec. 6, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/331; 719/332; 717/100
(58) Field of Classification Search ......... 719/331–332; 717/100
See application file for complete search history.

(56) References Cited

U.S. PATENT DOCUMENTS

| 7,058,940 | B2* | 6/2006 | Calahan .................. 717/167 |
| 7,305,666 | B2* | 12/2007 | Burger et al. ............. 717/140 |
| 2003/0167320 | A1 | 9/2003 | Perez |
| 2004/0003119 | A1 | 1/2004 | Munir et al. |
| 2004/0034860 | A1 | 2/2004 | Fernando et al. |
| 2004/0268309 | A1* | 12/2004 | Grover et al. ............. 717/120 |
| 2005/0071806 | A1* | 3/2005 | Sreedhar .................. 717/104 |
| 2006/0123383 | A1* | 6/2006 | Apte et al. ............... 717/100 |
| 2007/0089084 | A1* | 4/2007 | Elaasar ................... 717/100 |

OTHER PUBLICATIONS

"Microsoft Computer Dictionary", 2002, Microsoft Press, Fifth Edition, p. 499.*

* cited by examiner

*Primary Examiner*—Qing Wu
(74) *Attorney, Agent, or Firm*—Kunzler Needham Massey & Thorpe

(57) ABSTRACT

A solution for managing a set of artifacts for a runtime environment is provided, which enables improved tooling that supports runtime extensions to a runtime environment. In one embodiment, an extension handler is obtained for a runtime extension to the runtime environment. The runtime extension comprises a program code that can be included in the runtime environment to extend the default capabilities of a runtime engine/framework. The extension handler provides tooling support for extension artifacts that use/require the runtime extension. When a tooling request for an extension artifact is obtained, the tooling request is processed using the extension handler. In this manner, a tooling solution is shielded from needing to know the specifics of the extension artifact or corresponding runtime extension. Similarly, the developer of the extension handler for the runtime extension is shielded from needing to know any specifics of the tooling environment. As a result, the invention provides a tooling solution that is extensible to support the tooling requirements of an extensible runtime engine.

19 Claims, 4 Drawing Sheets

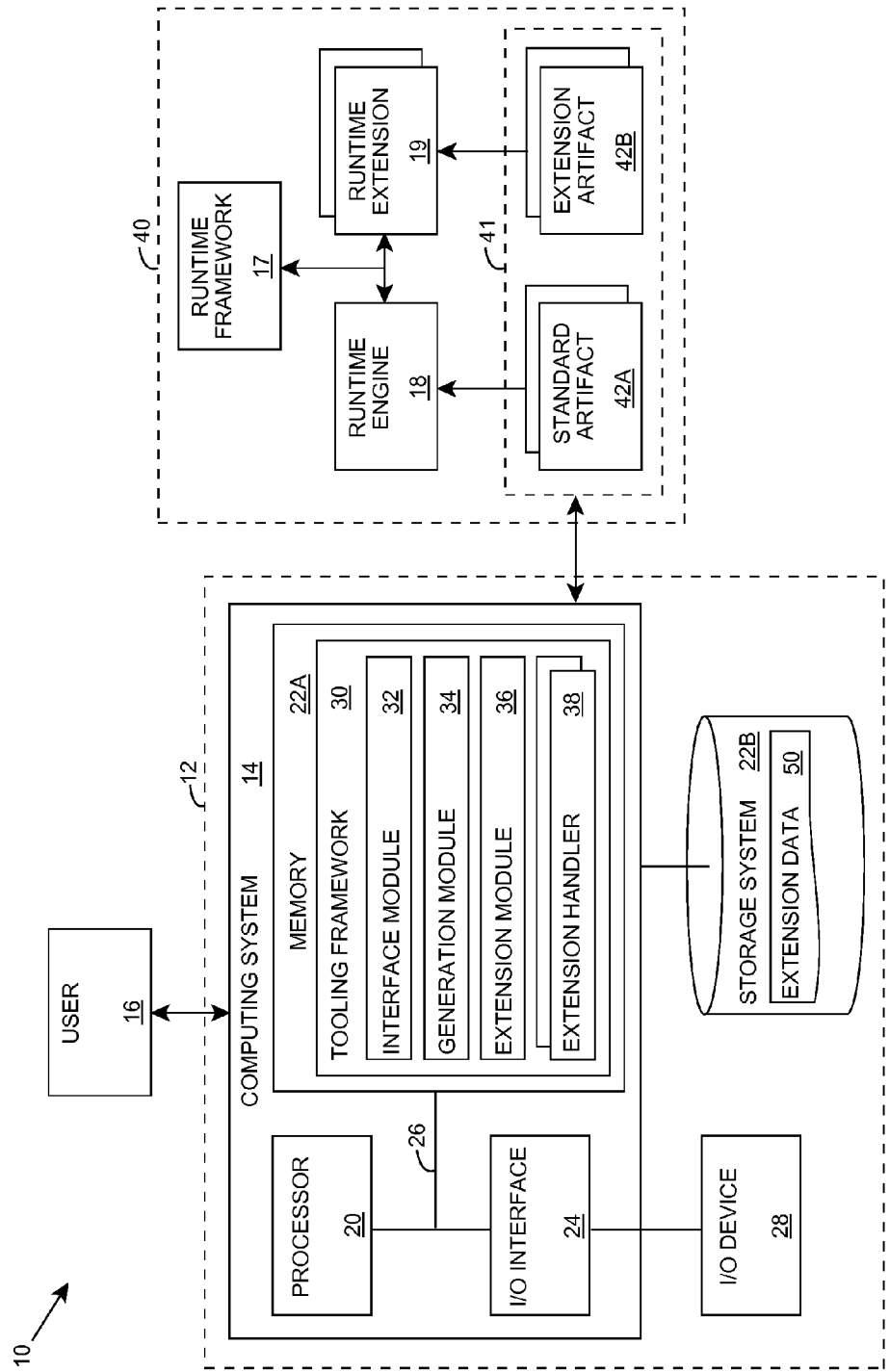

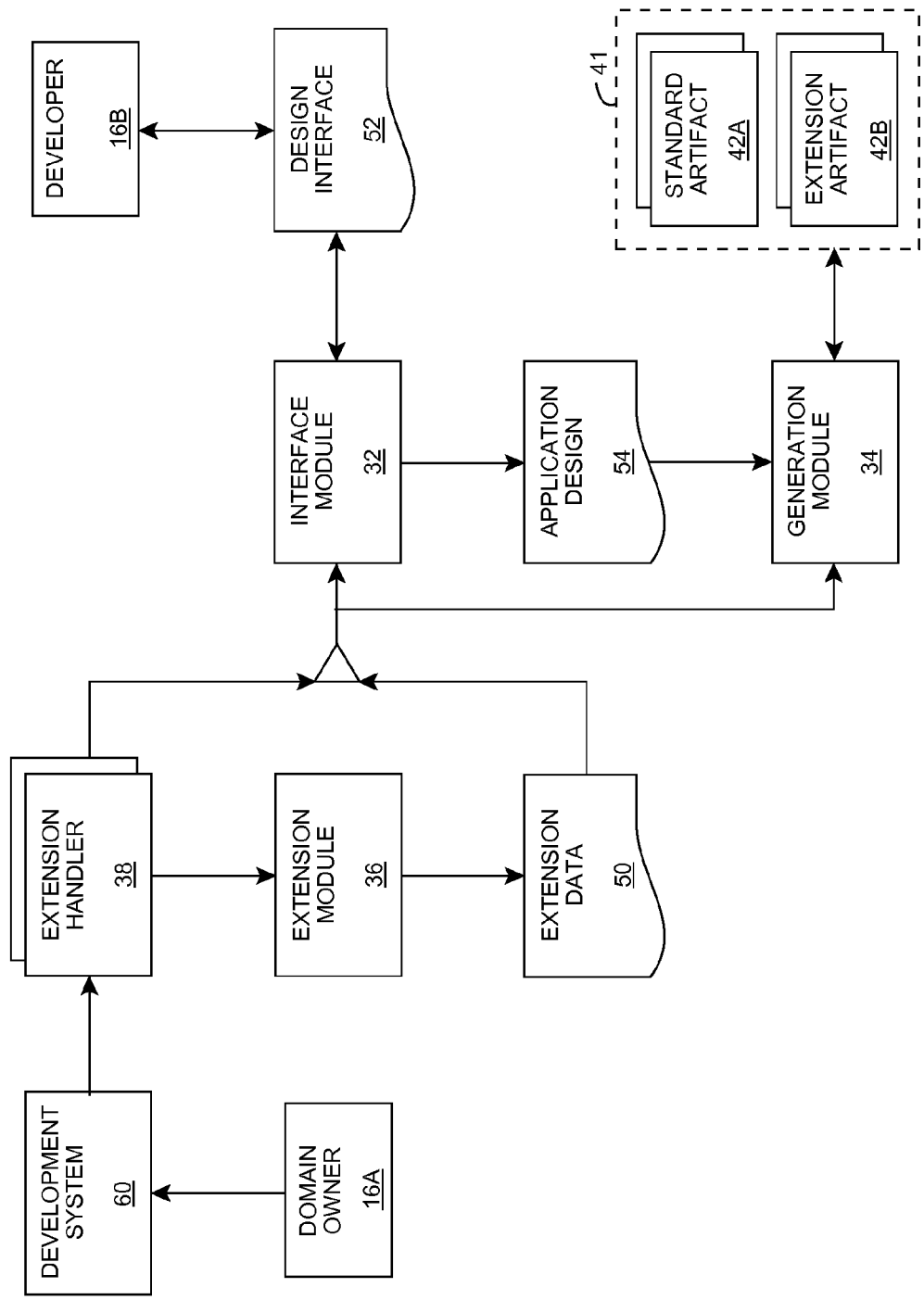

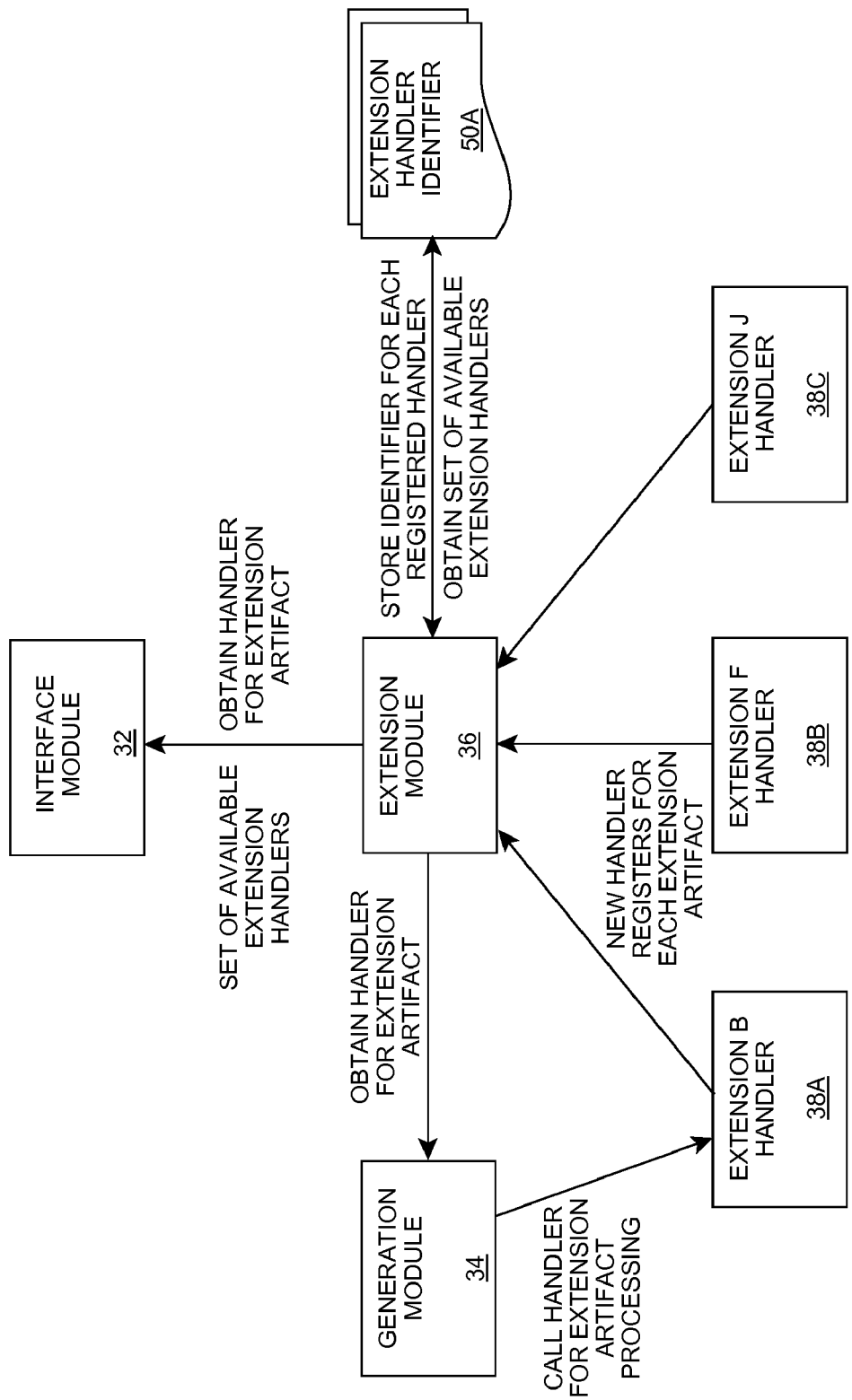

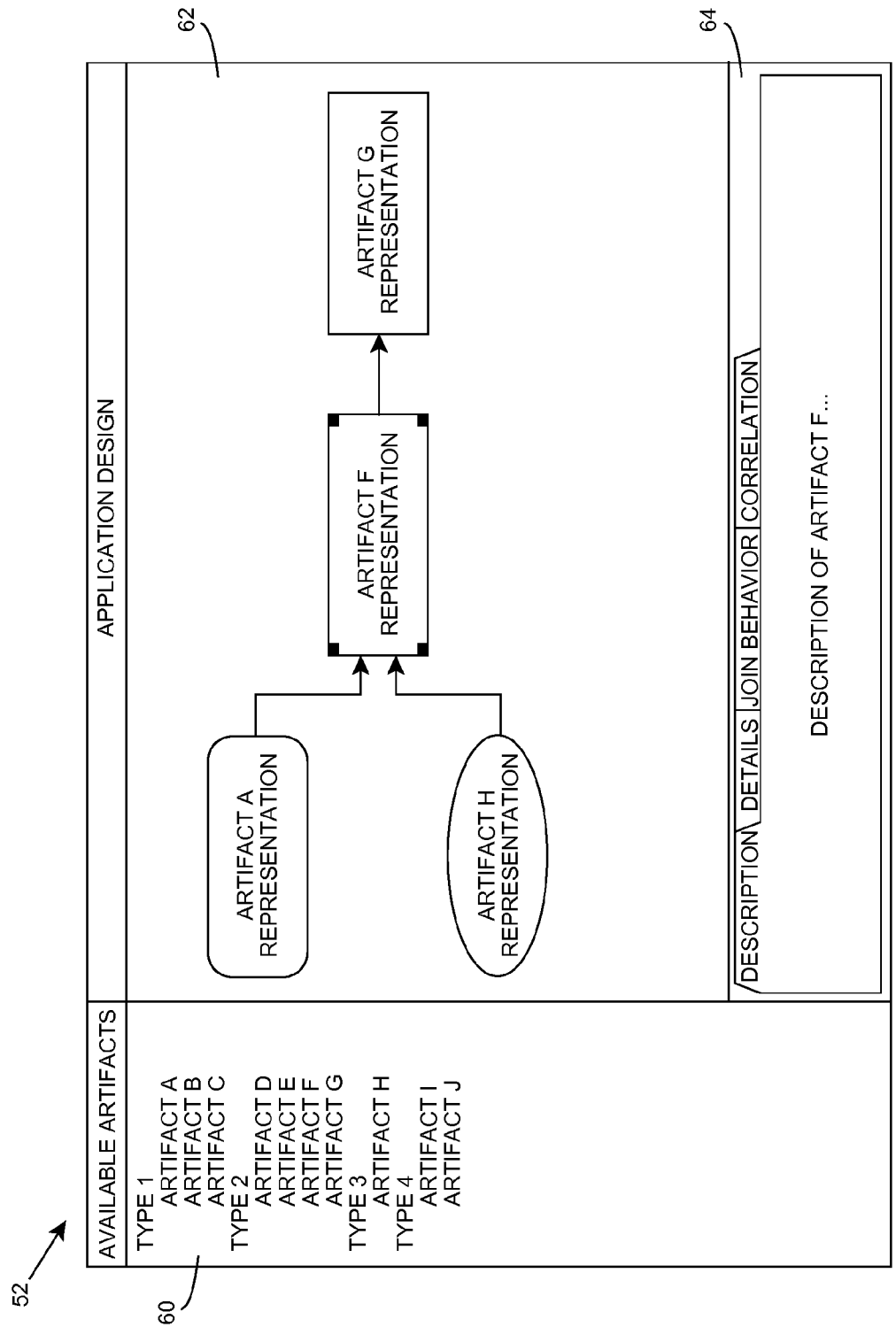

ARTIFACT MANAGEMENT FOR AN EXTENSIBLE RUNTIME ENVIRONMENT

FIELD OF THE INVENTION

The invention relates generally to managing a set of artifacts for a runtime environment, and more particularly, to a solution for enabling improved tooling that supports runtime extensions to a runtime environment.

BACKGROUND OF THE INVENTION

Software runtime engines frequently enable clients to add specialized behavior via one or more runtime extensions. To this extent, a software runtime engine can provide extension points, each of which describes interfaces that a runtime extension must follow to integrate with the runtime code. For example, an extension point can comprise a user exit that allows a client-registered function to be called, a replaceable subsystem (e.g., an authorization subsystem), and/or the like.

A tooling system is frequently used for creating program code executed by a corresponding runtime engine. To date, tooling approaches are limited in their ability to leverage capabilities provided by runtime extensions due to a lack of built-in knowledge of these runtime extensions. As a result, current tooling approaches are either limited to the use of built-in features of the runtime engine or require a runtime extension-specific tooling system to create program code that uses and/or is executed by the runtime extension.

Further, with the growing acceptance of data representation standards with built-in extensibility mechanisms, such as extensible markup language (XML) and Web Services Description Language (WSDL), runtime engines will need to support extension points based on particular additions to an extensible data format. To this extent, the corresponding tooling system(s) will need to support the end user's creation and manipulation of data objects that use these extensions. In fact, the data format of the extension-specific data may be provided by a third-party vendor and be unknown to the tooling system. To date, tooling approaches do not address this situation.

In view of the foregoing, a need exists to overcome one or more of the deficiencies in the related art.

BRIEF SUMMARY OF THE INVENTION

The invention provides a solution for managing a set of artifacts for a runtime environment, which enables improved tooling that supports runtime extensions to a runtime environment. In one embodiment, an extension handler is obtained for a runtime extension to the runtime environment. The runtime extension comprises a program code that can be included in the runtime environment to extend the default capabilities of a runtime engine/framework. The extension handler provides tooling support for extension artifacts that use/require the runtime extension. When a tooling request for an extension artifact is obtained, the tooling request is processed using the extension handler. In this manner, a tooling solution is shielded from needing to know the specifics of the extension artifact or corresponding runtime extension. Similarly, the developer of the extension handler for the runtime extension is shielded from needing to know any specifics of the tooling environment. As a result, the invention provides a tooling solution that is extensible to support the tooling requirements of an extensible runtime engine.

A first aspect of the invention provides a method of managing a set of artifacts for an extensible runtime environment, the method comprising: registering an extension handler for an extension artifact, the extension artifact comprising an artifact that can be included in an application and requires a runtime extension to execute in the runtime environment; and processing a tooling request for the extension artifact using the extension handler for the extension artifact.

A second aspect of the invention provides a system for managing a set of artifacts for an extensible runtime environment, the system comprising: a system for registering an extension handler for an extension artifact, the extension artifact comprising an artifact that can be included in an application and requires a runtime extension to execute in the runtime environment; and a system for processing a tooling request for the extension artifact, the system for processing using the extension handler to perform any artifact-specific functions required by the tooling request.

A third aspect of the invention provides a program product stored on a computer-readable medium, which when executed, enables a computer infrastructure to manage a set of artifacts for an extensible runtime environment, the program product comprising program code for enabling the computer infrastructure to: register an extension handler for an extension artifact, the extension artifact comprising an artifact that can be included in an application and requires a runtime extension to execute in the runtime environment; and process a tooling request for the extension artifact using the extension handler to perform any artifact-specific functions required by the tooling request.

A fourth aspect of the invention provides a method of generating a system for managing a set of artifacts for an extensible runtime environment, the method comprising: providing a computer infrastructure operable to: register an extension handler for an extension artifact, the extension artifact comprising an artifact that can be included in an application and requires a runtime extension to execute in the runtime environment; and process a tooling request for the extension artifact using the extension handler to perform any artifact-specific functions required by the tooling request.

A fifth aspect of the invention provides a business method for managing a set of artifacts for a runtime environment, the business method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 1 shows an illustrative environment for managing a set of artifacts for a runtime environment according to an embodiment of the invention.

FIG. 2 shows an illustrative data flow diagram that can be implemented by the tooling framework of FIG. 1 according to an embodiment of the invention.

FIG. 3 shows another illustrative data flow diagram that can be implemented by the tooling framework of FIG. 1 according to an embodiment of the invention.

FIG. 4 shows an illustrative design interface according to an embodiment of the invention.

DETAILED DESCRIPTION OF THE INVENTION

As indicated above, the invention provides a solution for managing a set of artifacts for a runtime environment, which enables improved tooling that supports runtime extensions to a runtime environment. In one embodiment, an extension handler is obtained for a runtime extension to the runtime environment. The runtime extension comprises a program code that can be included in the runtime environment to extend the default capabilities of a runtime engine/framework. The extension handler provides tooling support for extension artifacts that use/require the runtime extension. When a tooling request for an extension artifact is obtained, the tooling request is processed using the extension handler. In this manner, a tooling solution is shielded from needing to know the specifics of the extension artifact or corresponding runtime extension. Similarly, the developer of the extension handler for the runtime extension is shielded from needing to know any specifics of the tooling environment. As a result, the invention provides a tooling solution that is extensible to support the tooling requirements of an extensible runtime engine. As used herein, unless otherwise noted, the term "set" means one or more (i.e., at least one) and the phrase "any solution" means any now known or later developed solution.

In general, the invention enables a tooling developer and a domain owner to concentrate on their areas of expertise, without needing to be concerned with the details of the other. In particular, the invention's tooling framework provides a clear delineation between knowledge specific to tooling and tooling scenarios and knowledge specific to runtime domains, while allowing the tooling framework to be customized with the features, allowances, restrictions, actions, and/or the like, that are specific to the runtime domain. As a result, a domain owner can develop and provide code (e.g., one or more handlers) that supplies domain-specific behavior and/or information (e.g., the supported interface types, matching rules for connections between artifacts, supported qualifiers, and/or the like) and supplies the processing for managing the resulting artifact(s).

At the same time, the invention shields the domain owner from the details of tooling scenarios and user actions, such as drag-and-drop behavior, context menus and the enabling and disabling of menu choices, graphic rendering, and/or the like. Further, the domain owner does not need to know how to participate in top-down, bottom-up, or meet-in-the-middle tooling scenarios. Similarly, the invention frees the tooling developer from requiring built-in knowledge of specific runtime extensions. Under the invention, the tooling developer can delegate domain-specific processing to the extension handler(s) provided, regardless of the source of the extension handler and/or the types of artifact(s) that it generates.

Turning to the drawings, FIG. 1 shows an illustrative environment 10 for managing a set of artifacts 42A-B for a runtime environment 40 according to an embodiment of the invention. To this extent, environment 10 includes a computer infrastructure 12 that can perform the process described herein in order to manage artifact(s) 42A-B. In particular, computer infrastructure 12 is shown including a computing system 14 that comprises a tooling framework 30, which makes computing system 14 operable to manage artifact(s) 42A-B by performing the process described herein.

Computing system 14 is shown including a processor 20, a memory 22A, an input/output (I/O) interface 24, and a bus 26. Further, computing system 14 is shown in communication with an external I/O device/resource 28 and a storage system 22B. As is known in the art, in general, processor 20 executes computer program code, such as tooling framework 30, which is stored in memory 22A and/or storage system 22B. While executing computer program code, processor 20 can read and/or write data, such as extension data 50, to/from memory 22A, storage system 22B, and/or I/O interface 24. Bus 26 provides a communications link between each of the components in computing system 14. I/O device 28 can comprise any device that transfers information between a user 16 and computing system 14. To this extent, I/O device 28 can comprise a user I/O device to enable an individual user 16 to interact with computing system 14 and/or a communications device to enable a system user 16 to communicate with computing system 14 using any type of communications link.

In any event, computing system 14 can comprise any general purpose computing article of manufacture capable of executing computer program code installed thereon (e.g., a personal computer, server, handheld device, etc.). However, it is understood that computing system 14 and tooling framework 30 are only representative of various possible equivalent computing systems that may perform the process described herein. To this extent, in other embodiments, the functionality provided by computing system 14 and tooling framework 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing systems (e.g., a server cluster) that communicate over any type of communications link, such as a network, a shared memory, or the like, to perform the process described herein. Further, while performing the process described herein, one or more computing systems in computer infrastructure 12 can communicate with one or more other computing systems external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, tooling framework 30 enables computer infrastructure 12 to manage a set of artifacts 42A-B for a runtime environment 40. To this extent, tooling framework 30 is shown including an interface module 32, a generation module 34, an extension module 36, and a set of extension handlers 38. Operation of each of these modules is discussed further herein. However, it is understood that some of the various modules shown in FIG. 1 can be implemented independently, combined, and/or stored in memory for one or more separate computing systems that are included in computer infrastructure 12. Further, it is understood that some of the modules and/or functionality may not be implemented, or additional modules and/or functionality may be included as part of computer infrastructure 12. For example, as discussed herein, a third-party vendor, domain owner, or the like, can provide one or more of the set of extension handlers 38 apart from the remainder of tooling framework 30. To this extent, each extension handler 38 can comprise a pluggable component of a standard tooling framework 30.

Regardless, the invention provides a solution for managing artifact(s) 42A-B for a runtime environment 40 that is extensible. Runtime environment 40 includes a runtime framework 17, a runtime engine 18, and a set of runtime extensions 19. In general, runtime engine 18 processes artifacts 42A-B in an application 41 using any solution. A third party, such as a vendor, customer, solutions integrator, and/or the like, can develop a set of runtime extensions 19, each of which enables functionality that is not included in runtime engine 18. To this extent, when application 41 includes extension artifact(s) 42B that use this functionality, runtime engine 18 uses the corresponding runtime extension 19 to process the extension artifact(s) 42B. Runtime framework 17 includes a set of definitions that define the interaction between runtime engine 18 and runtime extension(s) 19 and/or program code that manages their interaction. It is understood that runtime environment 40 is only illustrative, and various alternative environments are possible to implement an extensible runtime environment 40. Additionally, it is understood that runtime environment 40 can be implemented in any type of computer infrastructure, such as computer infrastructure 12.

Tooling framework 30 supports the tooling of artifact(s) 42A-B in application 41. FIG. 2 shows an illustrative data flow diagram that can be implemented by tooling framework 30 (FIG. 1) according to an embodiment of the invention. In particular, a user, such as a domain owner 16A, can use a development system 60 to develop a set of extension handlers 38. Further, domain owner 16A can use development system 60 to develop a corresponding set of runtime extensions 19 (FIG. 1) for executing the extension artifacts 42B in runtime environment 40. Regardless, development system 60 can comprise any solution for developing software and can be implemented as part of computer infrastructure 12 (FIG. 1) or apart from computer infrastructure 12, in which each extension handler 38 is stored as program code using any solution (e.g., one or more executable files, one or more interpreted files, and/or the like). In one embodiment, each extension handler 38 implements a Java interface that contains methods for processing various types of tooling-related operations with respect to a corresponding set of extension artifacts 42B.

In any event, each extension handler 38 enables tooling framework 30 (FIG. 1) to support the inclusion of one or more extension artifacts 42B in an application 41 that executes in runtime environment 40 (FIG. 1). To this extent, each extension handler 38 implements various tooling-related functions for the corresponding extension artifact(s) 42B. For example, each extension handler 38 can generate an implementation of an extension artifact 42B based on an unimplemented representation of the extension artifact 42B (top-down creation), generate a representation of the extension artifact 42B based on a user-specified implementation of extension artifact 42B (bottom-up creation), undo the generation of an implementation and/or representation of extension artifact 42B, etc.

Further, each extension handler 38 can enable tooling framework 30 (FIG. 1) to integrate the extension artifact(s) 42B into a set of available artifacts for application 41. To this extent, each extension handler 38 can support various queries regarding the interface requirements for the set of extension artifacts 42B corresponding to the runtime extension. For example, each extension handler 38 can identify one or more artifacts (e.g., standard artifacts and/or other extension artifacts) that can be wired to/from an extension artifact 42B, can provide various interaction characteristics, such as the interface type(s) that are supported by an extension artifact 42B, extensions of interface types (e.g., a flow of calls), and/or the like.

Extension module 36 can obtain an extension handler 38 for a runtime extension 19 (FIG. 1). Extension module 36 can obtain each extension handler 38 using any solution. For example, extension module 36 can generate a user interface for display to domain owner 16A, which enables domain owner 16A to identify an extension handler 38. Further, extension module 36 can define an application program interface (API) or the like that enables a user, which comprises another system in this case, to provide an extension handler 38 to extension module 36.

In any event, in order to enable the use of each extension handler 38 by extension module 36 and/or other modules in tooling framework 30 (FIG. 1), extension module 36 can register each extension handler 38 using any solution. As part of registering an extension handler 38, extension module 36 can obtain (e.g., receive, identify, generate and/or the like) extension data 50 for each extension handler 38. For example, FIG. 3 shows another illustrative data flow diagram that can be implemented by the various modules of tooling framework 30 according to an embodiment of the invention. Referring to FIGS. 2 and 3, extension module 36 registers each extension handler 38A-C. As part of registering an extension handler 38A-C, extension module 36 can associate an identifier 50A for each extension handler 38A-C, which can be used to access each extension handler 38A-C.

Additionally, extension module 36 can obtain one of a plurality of types for the extension artifact(s) 42B that are managed using extension handler 38A-C. The type can be selected from a plurality of types of artifacts that are supported by runtime engine 18 (FIG. 1). Alternatively, the type could correspond to a new artifact type, supported by a new runtime extension 19 (FIG. 1), which can be added to an existing set of types. The type can subsequently be used to select an appropriate extension handler 38A-C for processing a tooling request for an extension artifact 42B of the corresponding type. Extension module 36 can use any solution for obtaining the type for each extension artifact 42B. For example, extension module 36 can provide a unique extension point for each extension handler 38A-C that manages a particular type of extension artifact 42B. Further, extension module 36 can obtain the type from each extension handler 38A-C and/or domain owner 16A, e.g., via a response to a request from extension module 36. More than one extension handler 38A-C can support a given type. Extension module 36 can use any solution for selecting which of those extension handlers 38A-C to use for processing an extension artifact 42B of that type. In any event, extension module 36 can store the type in extension data 50. Extension module 36 can obtain additional information for each extension handler 38A-C and store it in extension data 50. For example, extension module 36 can obtain a name/identifier for the corresponding runtime extension 19, name/identifier and/or interface types/characteristics of the corresponding extension artifact(s) 42B, and/or the like.

In any event, interface module 32 can include the set of extension artifacts 42B corresponding to the runtime extension(s) 19 (FIG. 1) in a set of available artifacts for inclusion in application 41. To this extent, extension module 36 can provide interface module 32 with a set of available extension handlers 38A-C, which interface module 32 can use to generate the set of available extension artifacts 42B and/or tooling operations. Alternatively, extension module 36 can provide interface module 32 with a set of available extension artifacts 42B and the corresponding extension handlers 38A-

C. In particular, extension module 36 can obtain an extension handler identifier 50A and/or other extension data 50 (e.g., a name and/or a type) for each extension artifact 42B and provide the extension data 50 to interface module 32. Using extension data 50, interface module 32 can include each extension artifact 42B in a set of available artifacts. In either case, interface module 32 can provide the set of available extension artifacts 42B to a user (e.g., an individual via a user interface, another system via an API, and/or the like).

For example, interface module 32 can generate a design interface 52 for display to a user, such as a developer 16B. In this case, interface module 32 can include the set of available artifacts in the design interface 52 for selection by developer 16B. Design interface 52 can enable developer 16B to define an application design 54 for application 41. To this extent, FIG. 4 shows an illustrative design interface 52 according to an embodiment of the invention, which includes a tree view 60 of available artifacts (e.g., sorted by type), an application design area 62 that displays some or all of application design 54 (FIG. 2), and an information area 64. Interface module 32 (FIG. 3) can use extension data 50 to correctly display a name and/or type for each available extension artifact 42B in tree view 60. For example, ARTIFACT B, ARTIFACT F, and ARTIFACT J, each can comprise an available extension artifact 42B that corresponds to extension handlers 38A-C in FIG. 3, respectively. Similarly, when a representation of an implementation of an extension artifact 42B is selected in framework design area 62, interface module 32 can use extension data 50 to display information on the selected extension artifact 42B.

In general, developer 16B (FIG. 3) can select an available artifact from tree view 60 and add an implementation of the artifact to framework design area 62 (e.g., using drag and drop or the like). Within framework design area 62, developer 16B can connect two or more representations of artifacts, select a representation of an implementation of an artifact, delete an implementation of an artifact, and/or the like. Information area 64 can display various information on a selected artifact implementation. It is understood that design interface 52 is only illustrative of various possible design interfaces 52 that include some or all of the interface features shown and/or additional interface features for use by developer 16B.

Returning to FIGS. 2 and 3, interface module 32 can obtain a tooling request for an artifact from developer 16B, e.g., via design interface 52, an API, and/or the like. Each tooling request can comprise an operation that developer 16B has requested to be performed on one or more artifacts in application 41. For example, a tooling request can comprise a request to add an implementation of an artifact 42A-B, remove an implementation of an artifact 42A-B, connect two implementations of artifacts 42A-B, and/or the like. The tooling request can be obtained for one or more standard artifacts 42A, one or more extension artifacts 42B, or some combination thereof.

When the tooling request is for an extension artifact 42B, interface module 32 can use the corresponding extension handler 38A-C to process any artifact-specific functions that are required by the tooling request. For some tooling requests, e.g., relocate a representation of an artifact implementation within design interface 52 (FIG. 4), interface module 32 can process the tooling request without the extension handler 38A-C. Similarly, for some tooling requests, such as connecting two implementations of artifacts, interface module 32 can process one or more tooling-specific functions (e.g., rendering a representation of the connection) without the extension handler 38A-C and one or more artifact-specific functions (e.g., determining if the desired connection is acceptable) using the extension handler 38A-C.

When interface module 32 requires an extension handler 38A-C to perform one or more artifact-specific functions, interface module 32 can call the extension handler 38A-C to perform the artifact-specific function(s). In one embodiment, interface module 32 obtains the extension handler 38A-C that corresponds to the artifact implementation from extension module 36 (e.g., based on a type of the extension artifact 42B), and calls the extension handler 38A-C to perform the artifact-specific function(s). In this case, interface module 32 can provide an extension handler identifier 50A to extension module 36, which can use the extension handler identifier 50A to identify the corresponding extension handler 38A-C. In another embodiment, interface module 32 provides extension module 36 with the extension handler identifier 50A and/or the desired artifact-specific function(s), and extension module 36 calls the appropriate extension handler 38A-C and returns any results.

Regardless, generation module 34 can use application design 54 to generate application 41. To this extent, generation module 34 can obtain the extension handler 38A-C for an extension artifact 42B (e.g., based on a type of the extension artifact 42B) included in application design 54, and call the extension handler 38A-C to generate one or more artifacts in application 41. For example, for top-down development, generation module 34 can call the extension handler 38A-C to generate an implementation of an extension artifact 42B based on a representation of the extension artifact 42B included in application design 54. Similarly, for bottom-up development, generation module 34 can call the extension handler 38A-C to generate a representation of an extension artifact 42B from a specified implementation of the extension artifact 42B. Further, when application design 54 is subsequently modified (e.g., an artifact is deleted), generation module 34 can call the extension handler 38A-C to undo the generation of an implementation of an extension artifact, representation of an extension artifact, and/or the like.

In order to process tooling requests for standard artifact(s) 42A, interface module 32 can use any solution. In one embodiment, the processing of tooling requests for standard artifacts 42A is implemented using standard handlers in a similar manner as that discussed above for the extension artifacts 42B. However, in this case, each standard handler can have standard handler data that is provided with tooling framework 30 (FIG. 1) and therefore would not require registration or the like. In this manner, the entire tooling framework 30 can be developed in a componentized manner.

In any event, returning to FIG. 1, tooling framework 30 can provide (e.g., deploy) application 41 to runtime environment 40 using any solution. Application 41 can include one or more standard artifacts 42A and/or one or more extension artifacts 42B, all of which are generated using tooling framework 30. As a result, tooling framework 30 provides a tooling solution that is extensible to support all of the tooling requirements of an extensible runtime environment 40. In particular, tooling framework 30 can support the tooling of one or more extension artifacts 42B with the use of one or more extension handlers 38.

While shown and described herein as a method and system for managing artifact(s) for a runtime framework, it is understood that the invention further provides various alternative embodiments. For example, in one embodiment, the invention provides a program product stored on a computer-readable medium, which when executed, enables a computer infrastructure to manage a set of artifacts for a runtime framework. To this extent, the computer-readable medium includes program code, such as tooling framework 30 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing system, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), on paper (e.g., capable of being scanned in as electronic data), and/or the like.

In another embodiment, the invention provides a method of generating a system for managing a set of artifacts for a runtime framework. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing system, such as computing system 14 (FIG. 1), from a computer-readable medium; (2) adding one or more computing systems to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as a solutions integrator, could offer to manage a set of artifacts for a runtime framework as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing system having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a set of artifacts for an extensible runtime environment, the method comprising:
   registering an extension handler to interface a tooling system with an extension artifact, the tooling system allowing a user to perform operations to create and manipulate program code of an application that executes in a runtime environment, the extension artifact comprising an artifact included in the application and requiring a runtime extension to execute in the runtime environment, the runtime extension comprising runtime program code extending capabilities of the runtime environment;
   processing a tooling request for the extension artifact using the extension handler for the extension artifact, the tooling request comprising an operation directed at the extension artifact, the tooling request initiated by the user through the tooling system; and
   calling the extension handler to perform an artifact-specific function specified by the tooling request in response to the operation directed at the extension artifact, the extension handler performing the artifact-specific function according to interface characteristics of the extension artifact.

2. The method of claim 1, further comprising performing a tooling-specific function without the extension handler.

3. The method of claim 1, further comprising obtaining the tooling request for the extension artifact.

4. The method of claim 1, the registering including associating an identifier with the extension handler.

5. The method of claim 1, further comprising including the extension artifact in a set of available artifacts for inclusion in the application.

6. The method of claim 1, the processing including generating an implementation of the extension artifact for inclusion in the application with the extension handler.

7. The method of claim 1, further comprising developing the extension handler.

8. A system for managing a set of artifacts for an extensible runtime environment, the system comprising:
   a processor;
   a memory comprising:
   a system registering an extension handler to interface a tooling system with an extension artifact, the tooling system allowing a user to perform operations to create and manipulate program code of an application that executes in a runtime environment, the extension artifact comprising an artifact included in the application and requiring a runtime extension to execute in the runtime environment, the runtime extension comprising runtime program code extending capabilities of the runtime environment;
   a system processing a tooling request for the extension artifact using the extension handler for the extension artifact, the tooling request comprising an operation directed at the extension artifact, the tooling request initiated by the user through the tooling system; and
   the system for processing the tooling request calling the extension handler to perform an artifact-specific function specified by the tooling request in response to the operation directed at the extension artifact, the extension handler performing the artifact-specific function according to interface characteristics of the extension artifact.

9. The system of claim 8, wherein the system for processing further performs one or more tooling-specific functions required by the tooling request without the extension handler.

10. The system of claim 8, further comprising a system for obtaining the tooling request for the extension artifact, wherein the system for obtaining includes the extension artifact in a set of available artifacts for the application.

11. The system of claim 8, wherein the extension handler generates an implementation of the extension artifact for inclusion in the application.

12. The system of claim 8, wherein the system for registering associates an identifier with the extension handler.

13. The system of claim 8, further comprising a system for developing the extension handler.

14. A computer-readable storage medium storing a program product, which when executed, enables a computer infrastructure to manage a set of artifacts for an extensible runtime environment, the program product comprising program code for enabling the computer infrastructure to:
    register an extension handler to interface a tooling system with an extension artifact, the tooling system allowing a user to perform operations to create and manipulate program code of an application that executes in a runtime environment, the extension artifact comprising an artifact included in the application and requiring a runtime extension to execute in the runtime environment, the runtime extension comprising runtime program code extending capabilities of the runtime environment;
    process a tooling request for the extension artifact using the extension handler for the extension artifact, the tooling request comprising an operation directed at the extension artifact, the tooling request initiated by the user through the tooling system; and
    call the extension handler to perform an artifact-specific function specified by the tooling request in response to the operation directed at the extension artifact, the extension handler performing the artifact-specific function according to interface characteristics of the extension artifact.

15. The program product of claim 14, wherein the program code for enabling the computer infrastructure to process enables the computer infrastructure to further perform one or more tooling-specific functions required by the tooling request without the extension handler.

16. The program product of claim 14, wherein the program code for enabling the computer infrastructure to register enables the computer infrastructure to associate an identifier with the extension handler.

17. The program product of claim 14, wherein the extension handler generates an implementation of the extension artifact for inclusion in the application.

18. The program product of claim 14, further comprising program code for enabling the computer infrastructure to obtain the tooling request for the extension artifact.

19. A system for managing a set of artifacts for an extensible runtime environment, the system comprising:
    an extension module registering an extension handler to interface a tooling system with an extension artifact, the tooling system allowing a user to perform operations to create and manipulate program code of an application that executes in a runtime environment, the extension artifact comprising an artifact included in the application and requiring a runtime extension to execute in the runtime environment, the runtime extension comprising runtime program code extending capabilities of the runtime environment;
    an interface module processing a tooling request for the extension artifact using the extension handler for the extension artifact, the tooling request comprising an operation directed at the extension artifact, the tooling request initiated by the user through the tooling system; and
    the interface module calling the extension handler to perform an artifact-specific function specified by the tooling request in response to the operation directed at the extension artifact, the extension handler performing the artifact-specific function according to interface characteristics of the extension artifact,
    wherein all or a portion of the extension module and the interface module comprise one or more of hardware and computer program code stored on one or more computer readable storage media.

* * * * *